United States Patent
Gatlin et al.

(10) Patent No.: US 7,350,579 B2
(45) Date of Patent: Apr. 1, 2008

(54) SAND AGGREGATING REAGENTS, MODIFIED SANDS, AND METHODS FOR MAKING AND USING SAME

(75) Inventors: Larry W. Gatlin, San Antonio, TX (US); Brian J. Hallett, San Antonio, TX (US); Ryan L. Cook, San Antonio, TX (US)

(73) Assignee: Clearwater International LLC, Houston, TX (US)

( * ) Notice: Subject to any disclaimer, the term of this patent is extended or adjusted under 35 U.S.C. 154(b) by 0 days.

(21) Appl. No.: 11/298,556

(22) Filed: Dec. 9, 2005

(65) Prior Publication Data

US 2007/0131422 A1    Jun. 14, 2007

(51) Int. Cl.
*E21B 43/267*    (2006.01)

(52) U.S. Cl. .............................. 166/308.3; 166/280.1; 166/283

(58) Field of Classification Search ............... None
See application file for complete search history.

(56) References Cited

U.S. PATENT DOCUMENTS

| | | | |
|---|---|---|---|
| 7,013,973 B2 * | 3/2006 | Danican et al. ............. | 166/263 |
| 7,131,491 B2 * | 11/2006 | Blauch et al. .............. | 166/276 |
| 2002/0165308 A1 | 11/2002 | Kinniard et al. ............ | 524/492 |
| 2003/0220204 A1 | 11/2003 | Baran et al. ................ | 507/200 |
| 2005/0092489 A1 * | 5/2005 | Welton et al. ........... | 166/280.2 |
| 2005/0277554 A1 * | 12/2005 | Blauch et al. .............. | 507/224 |
| 2006/0118299 A1 * | 6/2006 | Nguyen et al. ............. | 166/276 |
| 2006/0118300 A1 * | 6/2006 | Welton et al. .............. | 166/276 |

FOREIGN PATENT DOCUMENTS

| | | |
|---|---|---|
| GB | 816337 A | 7/1959 |
| GB | 1073338 A | 6/1967 |
| JP | 2005194148 A | 7/2005 |

* cited by examiner

*Primary Examiner*—Zakiya W. Bates
*Assistant Examiner*—Angela DiTrani
(74) *Attorney, Agent, or Firm*—Robert W Strozier (57) ABSTRACT

A method for treating solid materials is disclosed, where the treating compositions coats surfaces or portions of surfaces of the solid materials changing an aggregation or agglomeration propensity of the materials. Treated solid materials are also disclosed. The methods and treated materials are ideally suited for oil field applications.

35 Claims, 4 Drawing Sheets

SAND AGGREGATING REAGENTS, MODIFIED SANDS, AND METHODS FOR MAKING AND USING SAME

BACKGROUND OF THE INVENTION

1. Field of the Invention

The present invention relates to methods for modifying an aggregating propensity of metal oxide-containing solids, methods for using same and modified metal oxide compositions.

More particularly, the present invention relates to method for altering an aggregating propensity of metal oxide-containing solids, where the method includes the step of contacting the solids with an aggregation modifying composition. The present invention also relates to chemically modified metal oxide-containing solids having improved aggregating propensities. The present invention also relates to methods for aggregating particulate metal oxide-containing solids, especially in downhole applications and in any other applications where particulate metal oxide-containing solids aggregation is desirable.

2. Description of the Related Art

In many situations, sand and other particulate metal oxide-containing solids are difficult and to handle, pour and process due to their inability to aggregate or to cling to each other or to form aggregates aggregated masses that flow in a more controlled manner.

Although several technologies now exist for tackifying such particulate solid with a tackifying agent, there is a need in the art of a different treating composition to cause such particulate solids to self-aggregate and to methods for making self-aggregating particulate solids.

SUMMARY OF THE INVENTION

Compositions

The present invention provides a substrate including a metal oxide-containing solid surface treated with a treating composition, which imparts to the surface improved aggregating properties or improved particulate adherence or affinity properties, where the composition includes at least an acidifying agent and a surface modifying agent. The substrates are ideally suited for use in downhole applications.

The present invention provides a substrate having surfaces partially or completely coated with a composition of this invention comprising a reaction product of an amine and a phosphate ester, where the coating is deformable and where the substrate is ideally suited for filtering fines and/or other particulate materials from a fluid, especially fluids used in oil/gas well drilling, completion, production, fracturing, propping, other production enhancing processes or other related applications. The structures can be ceramic or ceramic fibers or wools coated partially or completely with the compositions of this invention. Such structures are well suited for filter media to be used with or without screens.

Method for Treating

The present invention provides a method for changing an aggregation potential of a metal oxide-containing surface including the step of contacting the metal oxide-containing surface with a composition of this invention under conditions sufficient to chemically modify all or a portion of the surface, where the surface can be associated with metal-oxide particles or the structures having a metal-oxide surface and where the composition includes at least an acidifying agent and a surface modifying agent.

Methods for Using the Treating Methods

Fracturing

The present invention provides a method for fracturing a formation including the step of pumping a fracturing fluid including a composition of this invention into a producing formation to enhance productivity at a pressure sufficient to fracture the formation and simultaneously to modify an aggregation potential and/or zeta-potential of formation particles and formation surfaces so that the formation particles aggregate and/or cling themselves and/or to the formation surfaces where the composition includes at least an acidifying agent and a surface modifying agent.

The present invention provides a method for fracturing a formation including the step of pumping a fracturing fluid into a producing formation to enhance productivity at a pressure sufficient to fracture the formation. After fracturing, a composition of this invention is pumped into the fractured formation to modify an aggregation potential and/or zeta-potential of formation particles and formation surfaces so that the formation particles aggregate and/or cling to themselves and/or the formation surfaces where the composition includes at least an acidifying agent and a surface modifying agent.

The present invention provides a method for fracturing a formation including the step of a pre-treating a producing formation with a composition of this invention to modify an aggregation potential and/or zeta-potential of formation surfaces so that the formation surfaces and particles formed therefrom will tend to aggregate and/or cling to themselves where the composition includes at least an acidifying agent and a surface modifying agent. After pre-treatment, a fracturing fluid is pumped into the formation to enhance productivity at a pressure sufficient to fracture the formation.

Fracturing and Propping

The present invention provides a method for fracturing and propping a formation including the step of pumping a fracturing fluid including a proppant and a composition of this invention into a producing formation to enhance productivity at a pressure sufficient to fracture the formation, with the proppant, to prop open the the fractures and, with the composition of this invention, to modify an aggregation potential and/or zeta-potential of formation particles and formation surfaces so that the formation particles aggregate and/or cling to themselves and/or the formation surfaces where the composition includes at least an acidifying agent and a surface modifying agent.

The present invention provides a method for fracturing and propping a formation including the step of pumping a fracturing fluid including a proppant into a producing formation to enhance productivity at a pressure sufficient to fracture the formation so that the proppant can prop up the fractures. After fracturing, a composition of this invention is pumped into the fractured formation to modify an aggregation potential and/or zeta-potential of formation particles and formation surfaces so that the formation particles aggregate and/or cling to themselves and/or the formation surfaces where the composition includes at least an acidifying agent and a surface modifying agent.

The present invention provides a method for fracturing and propping a formation including the step of pumping a fracturing fluid into a producing formation to enhance productivity at a pressure sufficient to fracture the formation. After fracturing, a proppant is pumped into the fracture formation to prop open fractures formed in the formation. After propping the formation, a composition of this invention is pumped into the propped and fractured formation to modify an aggregation potential and/or zeta-potential of the proppant, formation particles and formation surfaces so that the proppant and/or formation particles aggregate and/or cling to the formation surfaces where the composition includes at least an acidifying agent and a surface modifying agent.

The present invention provides a method for fracturing and propping a formation including the step of a pre-treating a producing formation with a composition of this invention to modify an aggregation potential and/or zeta-potential of formation surfaces so that the formation surfaces and particles formed therefrom will tend to aggregate and/or cling to themselves where the composition includes at least an acidifying agent and a surface modifying agent. After pre-treating, a fracturing fluid is pumping into the formation a producing formation to enhance productivity at a pressure sufficient to fracture the formation. After fracturing, a proppant is pumped into the fracture formation to prop open fractures formed in the formation.

Drilling

The present invention provides a method for drilling including the step of while drilling, circulating a drilling fluid to provide bit lubrication, heat removal and cutting removal, where the drill fluid includes a composition of this invention, which increases an aggregation potential or zeta potential of any particulate metal oxide-containing solid in the drilling fluid or that becomes entrained in the drilling fluid to increase solids removal where the composition includes at least an acidifying agent and a surface modifying agent.

The present invention provides a method for drilling including the step of while drilling, circulating a first drilling fluid to provide bit lubrication, heat removal and cutting removal. Upon encountering an underground structure that produces undesirable quantities of particulate metal oxide-containing solids, changing the first drilling fluid for a second drilling fluid including a composition of this invention to provide bit lubrication, heat removal and cutting removal and to increase an aggregation potential or zeta potential of any particulate metal oxide-containing solid in the drilling fluid or that becomes entrained in the drilling fluid to increase solids removal where the composition includes at least an acidifying agent and a surface modifying agent.

The present invention provides a method for drilling including the step of while drilling, circulating a first drilling fluid to provide bit lubrication, heat removal and cutting removal. Upon encountering an underground structure that produces undesirable quantities of particulate metal oxide-containing solids, changing the first drilling fluid for a second drilling fluid including a composition of this invention to provide bit lubrication, heat removal and cutting removal and to increase an aggregation potential or zeta potential of any particulate metal oxide-containing solid in the drilling fluid or that becomes entrained in the drilling fluid to increase solids removal where the composition includes at least an acidifying agent and a surface modifying agent. After passing through the structure that produces an undesired quantities of particulate metal oxide-containing solids, change the second drilling fluid for the first drilling fluid or a third drilling fluid.

Producing

The present invention provides a method for producing a well including the step of circulating a production fluid in a producing well to enhance productivity of the well, where the production fluid includes a composition of this invention, which increases an aggregation potential or zeta potential of any particulate metal oxide-containing solid in the production fluid or that becomes entrained in the production fluid to increase solids removal.

The present invention also provides a method for controlling sand or fines migration including the step of pumping a fluid including a composition of this invention through a matrix at a rate and pressure into a formation to control sand and fine production or migration into the production fluids.

The present invention also provide another method for controlling sand or fines migration including the step of depositing a coated particulate solid material of this invention adjacent screen-type sand and fines control devices so that the sand and/or fines are attracted to the coated particles and do not encounter or foul the screen of the screen-type device.

BRIEF DESCRIPTION OF THE DRAWINGS

The invention can be better understood with reference to the following detailed description together with the appended illustrative drawings in which like elements are numbered the same.

DETAILED DESCRIPTION OF THE INVENTION

The inventors have found that a composition can be formulated that when applied to a material including a metal-oxide surface, the surface becomes chemically modified changing is its affinity for similarly modified surfaces. When applied to particles including a metal-oxide surface such as particulate metal-oxides, the particles tend to aggregate and/or cling to similarly treated metal-oxide surfaces. In downhole applications, the ability of convert generally free flowing metal-oxide-containing particles into aggregated or agglomerated masses will decrease many downhole problems associated with the accumulation of particles in the well, the formation, production screens, production tubing or other downhole equipment or structures.

This invention uses chemicals to alter the aggregation potential or zeta potential of metal oxide surfaces causing the treated particles to attract, forming aggregated structures or agglomerates. These compositions can be applied during a drilling and fracturing or any other type of chemical injection treatment reducing coating the silica particles and formation face keeping the particles from migrating.

Compositions

The present invention provides a composition including:
a particulate metal oxide-containing solid surface acidifying agent; and
a particulate metal oxide-containing solid surface modifying agent.

The present invention provides a composition including:
a particulate metal oxide-containing solid surface acidifying agent;
a particulate metal oxide-containing solid surface modifying agent; and
a fluid carrier.

The present invention provides a composition including:
a particulate metal oxide-containing solid surface acidifying agent;
a particulate metal oxide-containing solid surface modifying agent;
an aggregation enhancing agent; and
a fluid carrier.

The present invention provides a composition including:
a particulate metal oxide-containing solid surface acidifying agent;
a particulate metal oxide-containing solid surface modifying agent;
an aggregation enhancing agent;
a thickening agent; and
a fluid carrier.

The present invention provides a composition including:
a particulate metal oxide-containing solid surface acidifying agent;
a particulate metal oxide-containing solid surface modifying agent; and
a particulate metal oxide-containing solid surface exchange agent.

The present invention also provides a composition including:
a particulate metal oxide-containing solid surface acidifying agent;
a particulate metal oxide-containing solid surface modifying agent;
a particulate metal oxide-containing solid surface exchange agent; and
a fluid carrier.

The present invention also provides a composition including:
a particulate metal oxide-containing solid surface acidifying agent;
a particulate metal oxide-containing solid surface modifying agent;
a particulate metal oxide-containing solid surface exchange agent; and
an aggregation enhancing agent.

The present invention also provides a composition including:
a particulate metal oxide-containing solid surface acidifying agent;
a particulate metal oxide-containing solid surface modifying agent;
a particulate metal oxide-containing solid surface exchange agent;
an aggregation enhancing agent; and
a fluid carrier.

The present invention also provides a composition including:
a particulate metal oxide-containing solid surface acidifying agent;
a particulate metal oxide-containing solid surface modifying agent;
a particulate metal oxide-containing solid surface exchange agent;
an aggregation enhancing agent; and
a thickening agent.

The present invention also provides a composition including:
a particulate metal oxide-containing solid surface acidifying agent;
a particulate metal oxide-containing solid surface modifying agent;
a particulate metal oxide-containing solid surface exchange agent;
an aggregation enhancing agent;
a thickening agent; and
a fluid carrier.

The present invention provides an aqueous composition including:
a particulate metal oxide-containing solid surface acidifying agent;
a particulate metal oxide-containing solid surface modifying agent; and
a particulate metal oxide-containing solid surface exchange agent.

The present invention also provides an aqueous composition including:
a particulate metal oxide-containing solid surface acidifying agent;
a particulate metal oxide-containing solid surface modifying agent;
a particulate metal oxide-containing solid surface exchange agent; and
an aqueous carrier.

The present invention also provides an aqueous composition including:
a particulate metal oxide-containing solid surface acidifying agent;
a particulate metal oxide-containing solid surface modifying agent;
a particulate metal oxide-containing solid surface exchange agent;
an aggregation enhancing agent; and
an aqueous carrier.

The present invention also provides an aqueous composition including:
a particulate metal oxide-containing solid surface acidifying agent;
a particulate metal oxide-containing solid surface modifying agent;
a particulate metal oxide-containing solid surface exchange agent;
an aggregation enhancing agent; and
a thickening agent; and
an aqueous carrier.

Methods for Treating Particulate Solids

The present invention provides a method for changing an aggregation potential of a particulate metal oxide-containing solid including the step of treating the particulate metal oxide-containing solid with a composition of this invention under conditions sufficient to acidify the surface of the particulate metal oxide-containing solid forming an acidified particulate metal oxide-containing solid having active surface hydroxyl groups (Sur-OH). After acidifying the particulate metal oxide-containing solid, the acidified particulate metal oxide-containing solid is treated with a surface modifying agent (A), which converts an effective portion of the Sur-OH groups of the acidified particulate metal oxide-containing solid into exchangeable surface salt (Sur-O$^-$-AH$^+$) groups to form a modified particulate metal oxide-containing solid having an effective number of Sur-O$^-$-AH$^+$ groups. After modifying the particulate metal oxide-containing solid, the modified particulate metal oxide-containing solid is treated with an exchange agent (Z-X), which converts an effective number of Sur-O$^-$-AH$^+$ groups into exchanged surface salt (Sur-O$^-$-Z$^+$) groups to form an exchange particulate metal oxide-containing solid having an effective number of Sur-O$^-$-Z$^+$ groups, where Z moieties alter an aggregation potential and/or zeta-potential of the of the particulate metal oxide-containing solid.

The present invention provides a method for changing an aggregation potential of a particulate metal oxide-containing solid including the step of treating the particulate metal oxide-containing solid with an acidifying agent under conditions sufficient to acidify the surface of the particulate metal oxide-containing solid to form an acidified particulate metal oxide-containing solid having an effective number of active surface hydroyl groups (Sur- OH). After forming the Sur- OH groups, the acidified particulate metal oxide-containing solid is treated with a surface modifying agent (A), which converts an effective portion of the Sur OH groups of the acidified particulate metal oxide-containing solid into active surface salts (Sur-O$^-$-AH$^+$) to form a modified particulate metal oxide-containing solid having a modifying effective amount of Sur-O$^-$-AH$^+$groups. If the A moiety alters an aggregations potential and/or zeta potential sufficiently to promote a desired degree of particle aggregation, then no other agents are needed. However, the method optionally and preferably includes a further step of exchanging the A moieties for a Z moiety derived from a phase transfer type agent. Thus, after forming the Sur-O$^-$-AH$^+$ groups, the modified particulate metal oxide-containing solid is treated with an exchange agent (Z-X), which converts an effective portion of the Sur-O$^-$-A$^+$groups of the modified particulate metal oxide-containing solid into active surface exchanged salt (Sur-O$^{--Z30}$) groups to form an exchanged particulate metal oxide-containing solid having an aggregating effective amount of Sur-O$^{--Z30}$ groups, where Z moieties alter an aggregation potential and/or zeta-potential of the particulate metal oxide-containing solid.

Treated Structures and Substrates

The present invention also broadly relates to structures and substrates treated with a composition of this invention, where the structures and substrates include surfaces that are partially or completely coated with a composition of this invention. The structures or substrates can be ceramic or metallic or fibrous. The structures or substrates can be spun such as a glass wool or steel wool or can be honeycombed like catalytic converters or the like that include channels that force fluid to flow through tortured paths so that particles in the fluid are forced in contact with the substrate or structured surfaces. Such structures or substrates are ideally suited as particulate filters or sand control media.

Methods for Using the Treating Methods

Fracturing

The present invention provides a method for fracturing a formation including the step of pumping a fracturing fluid including a composition of this invention into a producing formation to enhance productivity at a pressure sufficient to fracture the formation and simultaneously to modify an aggregation potential and/or zeta-potential of formation particles and formation surfaces so that the formation particles aggregate and/or cling to the formation surfaces.

The present invention provides a method for fracturing a formation including the step of pumping a fracturing fluid into a producing formation to enhance productivity at a pressure sufficient to fracture the formation. After fracturing, a composition of this invention is pumped into the fractured formation to modify an aggregation potential and/or zeta-potential of formation particles and formation surfaces so that the formation particles aggregate and/or cling to the formation surfaces.

Fracturing and Propping

The present invention provides a method for fracturing and propping a formation including the step of pumping a fracturing fluid including a proppant and a composition of this invention into a producing formation to enhance productivity at a pressure sufficient to fracture the formation, with the proppant, to prop open the the fractures and, with the composition of this invention, to modify an aggregation potential and/or zeta-potential of formation particles and formation surfaces so that the formation particles aggregate and/or cling to the formation surfaces.

The present invention provides a method for fracturing and propping a formation including the step of pumping a fracturing fluid including a proppant into a producing formation to enhance productivity at a pressure sufficient to fracture the formation so that the proppant can prop up the fractures. After fracturing, a composition of this invention is pumped into the fractured formation to modify an aggregation potential and/or zeta-potential of formation particles and formation surfaces so that the formation particles aggregate and/or cling to the formation surfaces.

The present invention provides a method for fracturing and propping a formation including the step of pumping a fracturing fluid into a producing formation to enhance productivity at a pressure sufficient to fracture the formation. After fracturing, a proppant is pumped into the fracture formation to prop open fractures formed in the formation. After propping the formation, a composition of this invention is pumped into the propped and fractured formation to modify an aggregation potential and/or zeta-potential of the proppant, formation particles and formation surfaces so that the proppant and/or formation particles aggregate and/or cling to the formation surfaces.

Drilling

The present invention provides a method for drilling including the step of while drilling, circulating a drilling fluid to provide bit lubrication, heat removal and cutting removal, where the drill fluid includes a composition of this invention, which increases an aggregation potential or zeta potential of any particulate metal oxide-containing solid in the drilling fluid or that becomes entrained in the drilling fluid to increase solids removal.

The present invention provides a method for drilling including the step of while drilling, circulating a first drilling fluid to provide bit lubrication, heat removal and cutting removal. Upon encountering an underground structure that produces undesirable quantities of particulate metal oxide-containing solids, changing the first drilling fluid for a second drilling fluid including a composition of this invention to provide bit lubrication, heat removal and cutting removal and to increase an aggregation potential or zeta potential of any particulate metal oxide-containing solid in the drilling fluid or that becomes entrained in the drilling fluid to increase solids removal.

The present invention provides a method for drilling including the step of while drilling, circulating a first drilling fluid to provide bit lubrication, heat removal and cutting removal. Upon encountering an underground structure that produces undesirable quantities of particulate metal oxide-containing solids, changing the first drilling fluid for a second drilling fluid including a composition of this invention to provide bit lubrication, heat removal and cutting removal and to increase an aggregation potential or zeta potential of any particulate metal oxide-containing solid in the drilling fluid or that becomes entrained in the drilling fluid to increase solids removal. After passing through the structure that produces an undesired quantities of particulate metal oxide-containing solids, change the second drilling fluid for the first drilling fluid or a third drilling fluid.

Producing

The present invention provides a method for producing a well including the step of circulating a production fluid in a producing well to enhance productivity of the well, where the production fluid includes a composition of this invention, which increases an aggregation potential or zeta potential of any particulate metal oxide-containing solid in the production fluid or that becomes entrained in the production fluid to increase solids removal.

The present invention provides a method for controlling sand or fines migration including the step of pumping a fluid including a composition of this invention through a matrix at a rate and pressure into a formation to control sand and fine production or migration into the production fluids. another method for controlling sand or fines migration including the step of depositing a coated particulate solid material of this invention adjacent screen-type sand and fines control devices so that the sand and/or fines are attracted to the coated particles and do not encounter or foul the screen of the screen-type device.

Suitable Agents

Suitable acidifying agents include, without limitation, sulfuric acid, phosphoric acid, hydrochloride acid, nitric acid, carboxylic acids, chlorated carboxylic acids, carbylsulfonic acids, where the carbyl group has between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof, or mixture or combinations thereof.

Exemplary examples of sulfonic acid type acidifying agents include, without limitation, alkysuflonic acids, arylsulfonic acids, alkarylsulfonic acids, aralkylsulfonic acids, or mixture or combinations thereof.

Exemplary examples of alkylsulfonic acids having between about between about 1 and 16 carbon atoms and the required hydrogen atoms to satisfy the valence and where one or more of the carbon atoms can be replaced by one or more hetero atoms selected from the group consisting of boron, nitrogen, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof, or mixture or combinations thereof. Exemplary examples of alkylsulfonic acids include, without limitation, methylsulfonic acid, ethylsulfonic acid, 2-hydroxyethylsulfonic acid ($OH-CH_2CH_2-SO_3H$), propylsulfonic acid (all isomers), butylsulfonic acid (all isomers), pentylsulfonic acid (all isomers), hexylsulfonic acid (all isomers), heptylsulfonic acid (all isomers), octylsulfonic acid (all isomers), nonylsulfonic acid (all isomers), decylsulfonic acid (all isomers), undecylsulfonic acid (all isomers), dodecylsulfonic acid (all isomers), C13 sulfonic acid (all isomers), C14 sulfonic acid (all isomers), C15 sulfonic acid (all isomers), C16 sulfonic acid (all isomers), or mixture or combinations thereof.

Exemplary examples arylsulfonic acids include, without limitation, benzene sulfonic acid, naphthalene sulfonic acid, or mixture or combinations thereof.

Exemplary examples alkarylsulfonic acids include, without limitation, methylbenzene sulfonic acid, ethylbenzene sulfonic acid, propylbenzene sulfonic acid, pentylbenzene sulfonic acid, hexylbenzene sulfonic acid, heptylbenzene sulfonic acid, octylbenzene sulfonic acid, nonylbenzene sulfonic acid, decylbenzene sulfonic acid, undecylbenzene sulfonic acid, dodecylbenzene sulfonic acid, tridecylbenzene sulfonic acid, di and tri-alkyl substituted analogs or mixture or combinations thereof.

Exemplary examples aralkylsulfonic acids include, without limitation, phenylmethyl sulfonic acid, phenylethyl sulfonic acid, other phenylated alkyl sulfonic acids or mixture or combinations thereof.

Suitable surface modifying agents include, without limitation, primary, secondary or tertiary amines, primary, secondary, or tertiary phosphines, or mixtures or combinations thereof. Preferred amines include, without limitation, primary amines having between about between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof, or mixture or combinations thereof.

Suitable exchange agents include, without limitation, any phase transfer agent. Exemplary examples of exchange agents useful in this invention include, without limitation, ammonium salts having the general formula $R^1R^2R^3R^4N^+Z^-$, phosphonium salts having the general formula $R^1R^2R^3R^4P^+Z^-$, or mixtures or combinations thereof, where $R^1$, $R^2$, $R^3$, and $R^4$ are independently a hydrogen atom or a carbyl group having between about between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof and $Z^-$ is $OH^-$, $OR^-$, $F^-$, $Cl^-$, $Br^-$, $I^-$, $HSO_4^-$, $H_2PO_4^-$, $HSO^-_3$, $H_2PO_3^-$, or similar counterions or mixtures or combinations thereof, where R a carbyl group having between about between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof.

Exemplary examples of phosphonium salts useful in this invention include, without limitation, phosphonium salts having the general formula $R^1R^2R^3R^4P^+Z^{31}$, where $R^1$, $R^2$, $R^3$, and $R^4$ are independently a hydrogen atom, an alkyl group, an aryl group, an aralkyl group, or an alkaryl group having between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof and $Z^-$ is $OH^-$, $OR^-$, $F^-$, $Cl^-$, $Br^-$, $I^-$, $HSO^{31}{}_4$, $H_2HSO^{31}{}_3$, $H_2PO^-{}_3$, or similar counterions or mixtures or combinations thereof, where R a carbyl group having between about between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof.

EXPERIMENTS OF THE INVENTION

Example 1

This example illustrates general procedures used in the preparation and testing of sand treated with an aggregating composition of this invention.

700 grams of 20/40 sand were pallet mixed at 1000 rpm in distilled water including 2 wt. % KCl at a sand to solution concentration of 1 lb/gal for 15 minutes. An aggregating composition of this invention was then added to the sand slurry in a concentration ranging from 0 to 8 gptg. The resulting slurry was mixed for 15 minutes at 1000 rpm. The treated sand slurry was then poured into a PVC flow rate cylinder and flushed with at least 5 volumes of fresh 2 wt. KCl. The flow rate of the 2 wt. % KCl solution was then measured through the resulting treated sand pack.

Example 2

This example illustrates the other set of general procedures used in the preparation and testing of sand treated with an aggregating compositions of this invention.

700 grams of 20/40 sand was pre-treated with an aggregating composition of this invention at concentration of 1.5, 3.0 and 5.0% v/w. The composition was stirred into the dry sand using a spatula for 5 minutes. After dry mixing, a 2.0 wt. % KCl solution was added with stirring. The resulting slurry of treated sand was poured into a PVC flow rate cylinder and washed with at least 5 volumes of 2.0 wt. % KCl. The flow rate of the 2 wt. % KCl solution was then measured through the sand pack.

The following aggregating compositions were prepared and test according to the procedures described in Examples 1 and 2.

| Components | wt. % |
|---|---|
| SG-1 | |
| Ethylene Glycol Monobutyl Ether | 4.16 |
| Alkylamidomine (DTO/AEP) | 7.20 |
| Fatty Acid Pitch | 14.40 |
| Deg40 (diethylene glycol) | 2.00 |
| Dodecyl benzene sulfonic Acid | 8.00 |
| Methyl diethanol amine (MDEA) bottoms (oligimers) | 2.05 |
| Quaternary Ammonium Chloride formed from 49 wt. % Akolidine 11 (mixture of alkyl pyridines from Lonza, Inc.), 25 wt. % Benzyl chloride and 26.08 wt. % methanol | 1.86 |
| Genamin T150 (tallow amine (15) ethoxylate) | 0.29 |
| Nonylphenyl Phosphate Ester | 0.19 |
| Solvent LPA-210 | 60.00 |
| SG-2 | |
| Crude Tall Oil Amide w/AEP | 21.60 |
| Isopropyl Alcohol | 7.20 |
| NP-6 | 0.54 |
| Genamin T150 (Ethoxylated Amine) | 0.04 |
| Deg40 (diethylene glycol) | 0.14 |
| Quaternary Ammonium Chloride formed from 49 wt. % Akolidine 11 (mixture of alkyl pyridines from Lonza, Inc.), 25 wt. % Benzyl chloride and 26.08 wt. % methanol | 5.16 |
| Dodecylbenzenesulfonic Acid | 2.75 |
| Bis Quat | 0.17 |
| MDEA bottoms (oligimers) | 1.53 |
| Amine Heads (DCH Residues) | 0.56 |
| Solvent LPA-210 | 60.00 |
| SG-3 | |
| Quaternary Ammonium Chloride formed from 49 wt. % Akolidine 11 (mixture of alkyl pyridines from Lonza, Inc.), 25 wt. % Benzyl chloride and 26.08 wt. % methanol | 68.98 |
| MDEA bottoms (oligimers) | 7.21 |
| Nonylphenol Ethoxylate 6.0 | 14.9 |
| Dodecylbenzenesulfonic Acid | 4.37 |
| Isopropyl Alcohol | 3.24 |
| Water | 1.30 |
| SG-4 | |
| Quaternary Ammonium Chloride formed from 49 wt. % Akolidine 11 (mixture of alkyl pyridines from Lonza, Inc.), 25 wt. % Benzyl chloride and 26.08 wt. % methanol | 60.00 |
| MDEA bottoms (oligimers) | 18.00 |
| NP-6 (Nonylphenol Ethoxylate 6.0) | 6.20 |
| Genamin T150 (Ethoxylated Amine) | 0.46 |
| TMP PO/EO Block Polyol | 1.60 |
| Bis Quaternary ammonium salt formed from 50 wt. % coconut oil DMAPA amide, 16 wt. % dichloroethyl ether, 7.41 wt. % Water 28.56 wt. % methanol | 2.00 |
| Dodecylbenzenesulfonic Acid | 4.55 |
| Water | 7.64 |

Zeta Potential Measurements

The Zeta potential is defined by the charge that develops at the interface between solid surfaces. Zeta potential is therefore a function of the surface charge of the particle, any adsorbed layer at the interface, and the nature and composition of the surrounding suspension medium. In other words Zeta potential can be affected by (1) changes in pH, (2) conductivity of the medium (Salinity and kind of salt), and (3) concentration of particular additives (polymer, non-ionic surfactants etc.).

In order to get the Zeta Potential using the Zetasizer (Nano) Z of Malvern by microelectrophoresis the system needs to have solids or colloids in the range between 3 nm and 20 μm. To characterize the influence of different additives in the system, Silica Flour was used instead of sand 20/40.

The amount of silica powder was set at 0.25 ppg in order to decrease the settling effects during the tests measurements. On the other hand, the only way to get well defined peaks (as narrow as possible) was to add KCl in concentrations of 0.5% or less.

Tables 1-2 show the results of the influence of the additives SG-1 and SG-2 on the measured Zeta Potential values when the additives were added to a Silica Flour slurry with mixing. It was found that Zeta Potential values varied with time indicating that increased exposure time allows the additive to absorbs on the particle.

Figure 1:
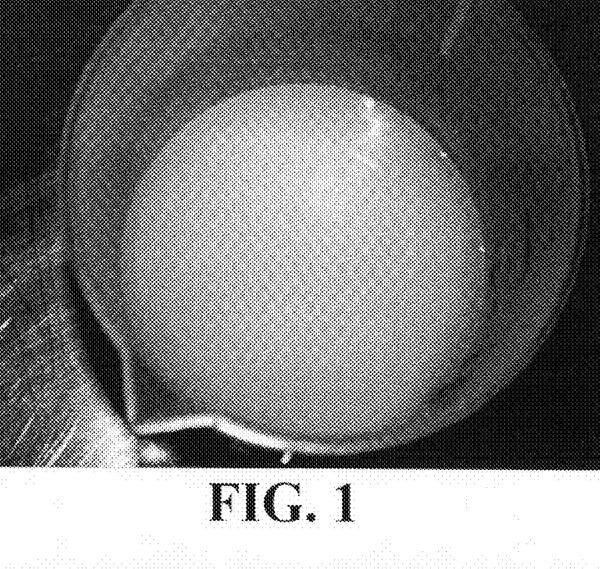
FIG. 1 is a photograph depicting 0.25 pptg Silica Flour in distilled water containing 0.5 wt. % KCl.
Figure 2:
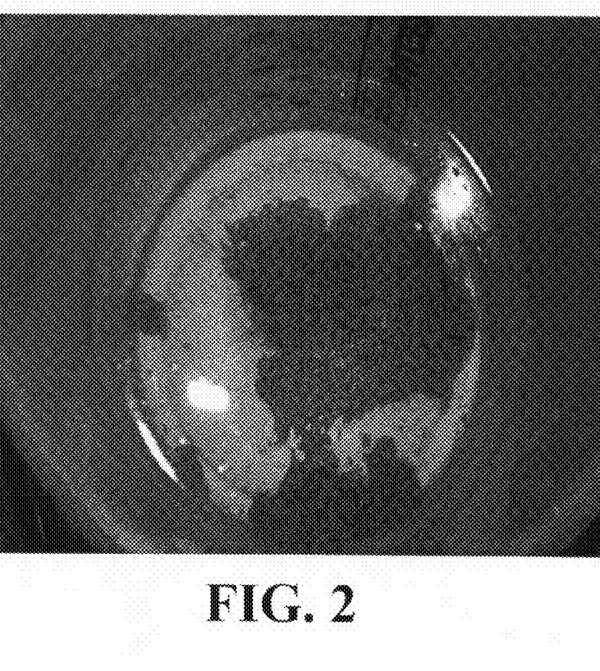
FIG. 2 is a photograph depicting 0.25 pptg Silica Flour in distilled water containing 0.5% KCl and 8 gptg of the aggregating composition designated SG-1.
Figure 3:
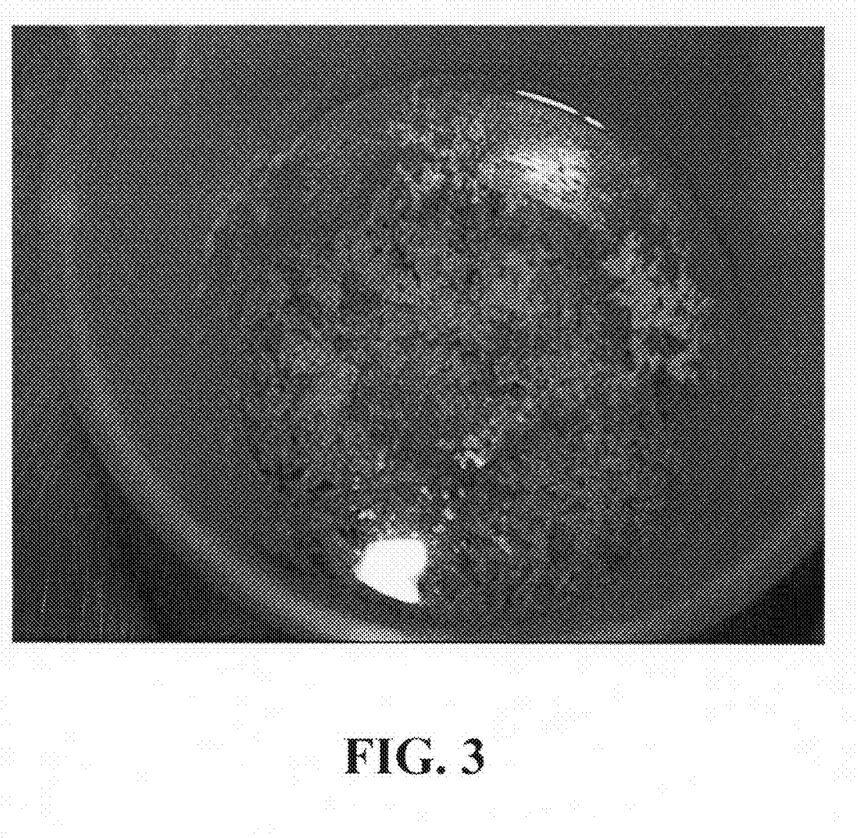
FIG. 3 is a photograph depicting 0.25 pptg Silica Flour in distilled water containing 0.5% KCl and 8 gptg of the aggregating composition designated SG-2.
Figure 4:
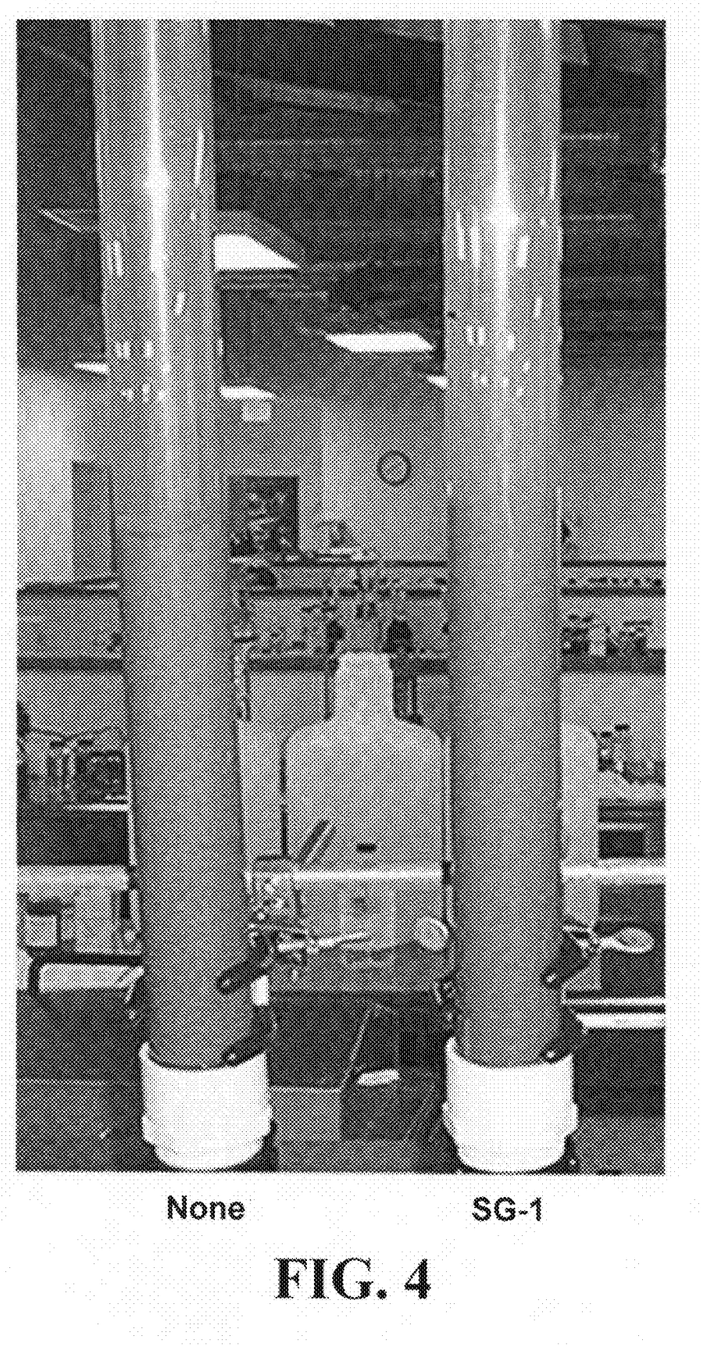
FIG. 4 is a photograph depicting a untreated sand pack and sand packs treated with 5% v/w of aggregating compositions designated SG-1.

For additive SG-1, there was not a high degree of variation of Zeta potential even at concentrations of 8 gptg. In all the cases the Zeta potential measurements were lower than -30 mV which will reflect that this system is not changing surface charge in the way that allow the silica to agglomerate. Table 2 shows that additive SG-2 has strong influence in the Zeta Potential increasing the values up to -16.1 mV at a concentration of 3 gptg or higher enough to make the slurry reach a Zeta Potential measurement lower or close to -30 mV. Zeta Potential values comprehended (-30 and 30 mV) reflects the effective charge is low enough on the particles that the repulsion between them are lowered to one point where flocculation, particles adhesion can take place. Another way to determine that SG-2 has a real impact in the Zeta Potential was by observation on how the solution clears out (decrease in the turbidity) and how the silica powder gather together once stopped-the mixing was stopped (FIGS. 1-3). In this case as long as SG-2 concentration was higher the water solution gets more clear and the silica powder gather in a more reduced area once settled. At 8 gptg SG-2 concentration it was observed a flocculation of the silica flour in the slurry (FIG. 3).

Table 3 shows the result of adding SG-3 in the silica powder solution. In all the cases although the measured Zeta Potential values were well in the range between −30 and 30 mV the measures were NOT reliable as long as the standard deviation are higher than 250 mV.

TABLE 1

Zeta Potentials of SG-1 Treated Sand

| SG-1 Concentration (gptg) | Mixing time (min) | Mean Zeta Potential (mV) | Zeta Potential deviation (mV) |
|---|---|---|---|
| 0 | 10 | −47.8 | 38.1 |
| 1 | 10 | −43.1 | 32.3 |
| 2 | 10 | −48.0 | 23.8 |
| 4 | 10 | −40.0 | 21.3 |
| 6 | 10 | −40.8 | 13.7 |
| 8 | 10 | −38.4 | 16.9 |
| 3 | 60 | −46.0 | 17.5 |
| 3 | 180 | −47.4 | 15.5 |

Final pH 7.82–8.23

TABLE 2

Zeta Potentials of SG-2 Sand

| SG-2 Concentration (pptg) | Mean Zeta Potential (mV) | Zeta Potential deviation (mV) |
|---|---|---|
| 0 | −47.8 | 38.1 |
| 2 | −37.9 | 12.1 |
| 3 | −32.6 | 11.6 |
| 4 | −19.1 | 11.7 |
| 6 | −13.4 | 12.0 |
| 8 | −16.1 | 12.1 |

Final pH 8.32–8.42

Flow Tests Through Sand Pack

It was determined the influence of the sand grip additives in the flow of 2% KCl solution through a 20/40 pretreated sand.

Table 3 shows the effect of pre-treating sand with SG-1 over the flow rate of the 2% KCl brine through the sand pack. In this case the drainage tests did show low variation in the flow through the treated sand even at treating concentrations of 8 gptg of SG-1.

On the other hand Table 4 shows the increase of SG-2 in the slurry system decreases the flow rate of the brine through the sand when it was treated with 3 gptg of SG-2 and even blocked the flow of the brine when the concentration is higher than 4 gptg. This change in the tendency agrees with what was observed in the Zeta potential values (Table 2) where it was observed a clear decrease in the absolute value of the Zeta Potential when the concentration of SG-2 was higher than 3 gptg in the treating solution.

TABLE 3

Sand Flow Rate Measurements Through SG-1 Treated Sand

| SG-1 Concentration (gptg) | Average flow rate (ml/min) | Flow rate ratio (Treat./N-Treat.) |
|---|---|---|
| 0 | 387 | 1.00 |
| 2 | 400 | 1.03 |
| 4 | 422 | 1.09 |
| 6 | 452 | 1.17 |
| 8 | 452 | 1.17 |

TABLE 4

Sand Flow Rate Measurements Through SG-2 Treated Sand

| SG-2 Concentration (gptg) | Average flow rate (ml/min) | Flow rate ratio (Treat./N-Treat.) |
|---|---|---|
| 0 | 387 | 1.00 |
| 2 | 395 | 1.03 |
| 3 | 110 | 0.28 |
| 4 | Blocked | Blocked |
| 8 | Blocked | Blocked |

Effect of Pre-Treating the Sand in Dry Conditions

It was determined the influence of the aggregating additives in the flow of 2% KCl solution through a 20/40 pretreated sand. In this case the sand was pre-treated in dry before being mixed with the 2.0% KCl Solution. The sand slurry was then poured into a plastic cylinder and after being washed with 5 volumes of 2% KCl solution. The flow rate through the sand pack was then determine using the brine solution.

Figure 5:
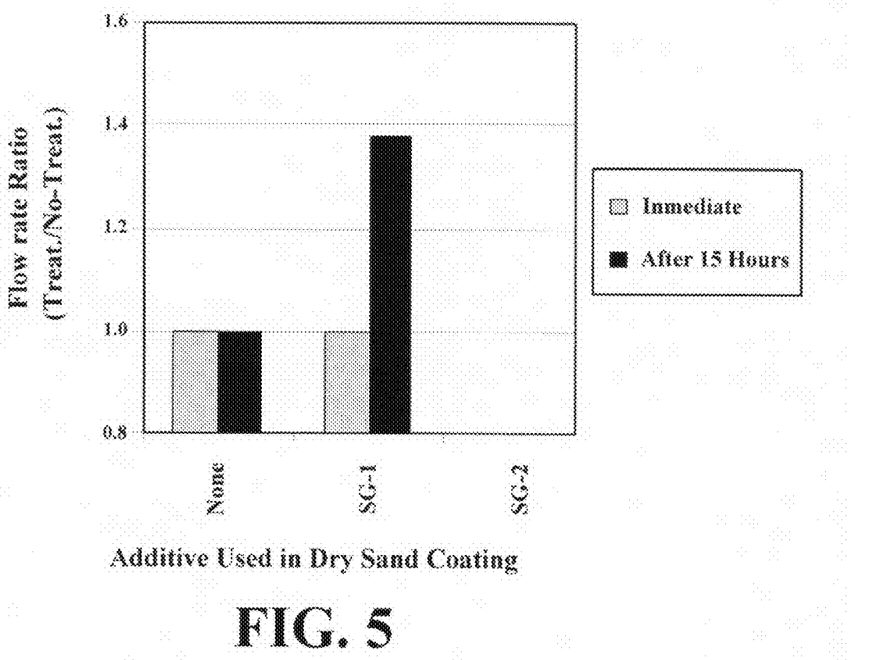
FIG. 5 depicts a chart of flow rate ratio of 2 wt. % KCl brine through an untreated sand packand sand packs treated with 5% v/w of ten aggregating compositions of this invention designated SG-1 through SG-2.

Table 5 shows the effects of additives SG-1 to SG-4 in the brine flow when added to dry sand at concentration of 5% v/w as shown in FIG. 5. Treatment with 5% v/w of SG-1 showed an appreciable increase in the flow rate of 2% KCl solution after 15 hours of treatment as shown in FIG. 5. In the case of dry sand treating with SG-2 it was observed again a kind of sand flocculation and therefore blocking of the sand system (Similar when added the additive directly to the sand in water solution) as shown in FIG. 5.

Figure 6:
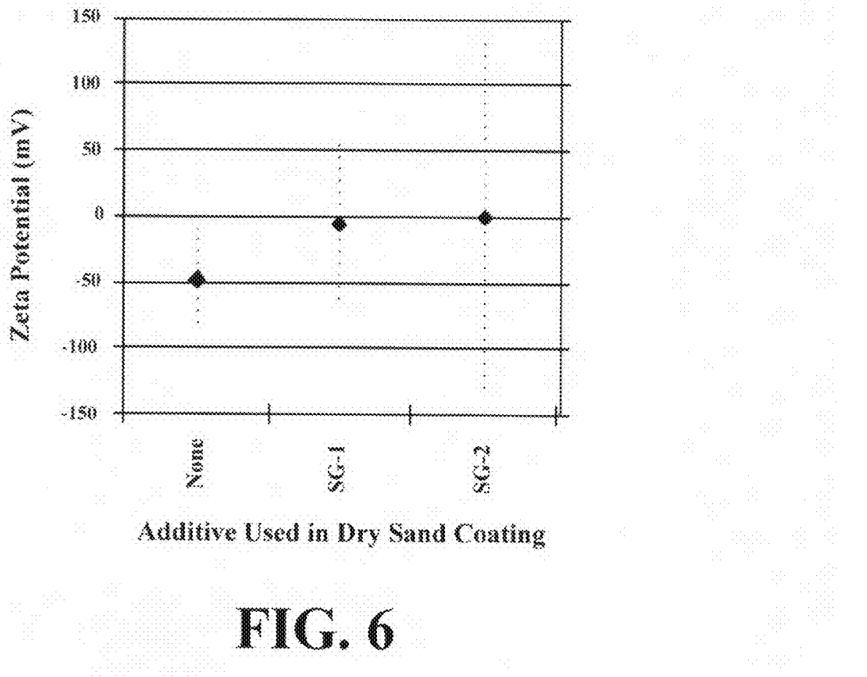
FIG. 6 depicts a graph of Zeta potential mean and deviation values of untreated silica flour and silica flour treated with 5% v/w of ten aggregating compositions of this invention designated SG-1 through SG-2, where the initial Silica flour concentration was 0.25 ppg in 0.5 wt.% KCl brine.

Referring to FIG. 6, the changes in the Zeta Potential with the addition of SG-1 and SG-2 are shown when added to dry silica flour and later measured in a 0.25 ppg of silica flour in 0.5% KCl solution. In this case as it was expected SG-3 and SG-7 and SG-10 not only show Zeta Potential values between 20 and −20 mV but also the lowest standard deviation in the measurement.

TABLE 5

Flow Rate Measurements Through Pre-treated Sand

| Treating Agent | Average Flow Rate immediate (after 15 h) (mL/min) | Flow Rate Ratio treated/untreated immediate (after 15 h) | Zeta Potential‡ (mV) | Observation |
|---|---|---|---|---|
| Control | 352 (352) | 1.00 (1.00) | −47.85 ± 38.19 | |
| SG-1 | 352 (486) | 1.00 (1.38) | −4.89 ± 59.62 | slight increase in pack height |
| SG-2 | Blocked (Blocked) | Blocked (Blocked) | −0.37 ± 130.22 | pack flocculated |
| SG-3 | 352 (360) | 100 (1.02) | −5.12 ± 24.75 | |
| SG-4 | 352 (405) | 1.00 (1.52) | −12.41 ± 5.71 | increase in pack height |

All references cited herein are incorporated by reference to the extent permitted by 35 U.S.C. &&101-146. 37 CFR 1 et seq. and the MPEP. Although the invention has been disclosed with reference to its preferred embodiments, from reading this description those of skill in the art may appreciate changes and modification that may be made which do not depart from the scope and spirit of the invention as described above and claimed hereafter.

We claim:

1. A method for fracturing a formation comprising the step of: pumping a fracturing fluid including a composition comprising at least an acidifying agent and a surface modifying agent into a producing formation to enhance productivity at a pressure sufficient to fracture the formation and simultaneously to modify at least one of an aggregation potential and a zeta-potential of formation particles and formation surfaces so that the formation particles aggregate and/or cling to themselves and/or to the formation surfaces, where the acidifying agent acidifies the formation particles and the formation surfaces producing an effective number of surface hydroxyl groups (Sur- OH) and the surfacing modifying agent (A) converts an effective portion of the Sur-OH groups into active surfaces salts (Sur-O$^-$-AH$^+$) resulting in the modification of the at least one of an aggregation potential and a zeta-potential of the formation particles and the formation surfaces.

2. The method of claim 1, wherein the composition further includes:
   a particulate metal oxide-containing solid surface exchange agent (Z-X), where the exchange agent converts an effective amount of the active surfaces salts (Sur-O$^-$-AH$^+$) into exchanged surface salt (Sur-O$^-$-AH$^+$) groups.

3. The method of claim 1, wherein the composition further includes:
   an aggregation enhancing agent.

4. The method of claim 1, wherein the composition further includes:
   a fluid carrier.

5. The method of claim 4, wherein the composition further includes:
   a thickening agent.

6. A method for fracturing a formation comprising the step of: pumping a fracturing fluid into a producing formation to enhance productivity at a pressure sufficient to fracture the formation; and pumping a composition comprising at least an acidifying agent and a surface modifying agent into the fractured formation to modify at least one of an aggregation potential and a zeta-potential of formation particles and formation surfaces so that the formation particles aggregate and/or cling to themselves and/or the formation surfaces, where the acidifying agent acidifies the formation particles and the formation surfaces producing an effective number of surface hydroxyl groups (Sur-OH) and the surfacing modifying agent (A) converts an effective portion of the Sur-OH into active surfaces salts (Sur-O$^-$-AH$^+$) resulting in the modification of the at least one of an aggregation potential and a zeta-potential of the formation particles and the formation surface.

7. The method of claim 6, wherein the composition further includes:
   a particulate metal oxide-containing solid surface exchange agent (Z-X), where the exchange agent converts an effective amount of the active surfaces salts (Sur-O$^-$-AH$^+$) into exchanged surface salt (Sur-O$^-$-Z$^+$) groups.

8. The method of claim 6, wherein the composition further includes:
   an aggregation enhancing agent.

9. The method of claim 6, wherein the composition further includes:
   a fluid carrier.

10. The method of claim 9, wherein the composition further includes:
    a thickening agent.

11. A method for fracturing a formation comprising the step of: pre-treating a producing formation with a composition comprising at least a particulate metal oxide-containing solid surface acidifying agent and a particulate metal oxide-containing solid surface modifying agent to modify at least one of an aggregation potential and a zeta-potential of formation surfaces so that the formation surfaces and particles formed therefrom will tend to aggregate and/or cling to themselves where the composition includes at least an acidifying agent and a surface modifying agent, where the acidifying agent acidifies the formation particles and the formation surfaces producing an effective number of surface hydroxyl groups (Sur-OH) and the surfacing modifying agent (A) converts an effective portion of the Sur-OH groups into active surfaces salts (Sur-O$^-$-AH$^+$) resulting in the modification of the at least one of an aggregation potential and a zeta-potential of the formation particles and the formation surfaces; and pumping a fracturing fluid into the formation to enhance productivity at a pressure sufficient to fracture the formation.

12. The method of claim 11, wherein the composition further includes:
a particulate metal oxide-containing solid surface exchange agent (Z-X), where the exchange agent converts an effective amount of the active surfaces salts (Sur-O$^-$-AH$^+$) into exchanged surface salt (Sur-O$^-$-Z$^+$) groups.

13. The method of claim 11, wherein the composition further includes:
an aggregation enhancing agent.

14. The method of claim 11, wherein the composition further includes:
a fluid carrier.

15. The method of claim 14, wherein the composition further includes:
a thickening agent.

16. A method for fracturing and propping a formation comprising the step of:
pumping a fracturing fluid including a proppant and a composition comprising at least a particulate metal oxide-containing solid surface acidifying agent and a particulate metal oxide-containing solid surface modifying agent into a producing formation to enhance productivity at a pressure sufficient to fracture the formation, where the proppant is adapted to prop open the fractures and, where the composition is adapted to modify at least one of an aggregation potential and a zeta-potential of formation particles and formation surfaces so that the formation particles aggregate and/or cling to themselves and/or the formation surfaces and where the acidifying agent acidifies the formation particles and the formation surfaces producing an effective number of surface hydroxyl groups (Sur-OH) and the surfacing modifying agent (A) converts an effective portion of the Sur-OH groups into active surfaces salts (Sur-O$^-$-AH$^+$) resulting in the modification of the at least one of an aggregation potential and a zeta-potential of the formation particles and the formation surfaces.

17. The method of claim 16, wherein the composition further includes:
a particulate metal oxide-containing solid surface exchange agent (Z-X), where the exchange agent converts an effective amount of the active surfaces salts (Sur-O$^-$-AH$^+$) into exchanged surface salt (Sur-O$^-$-Z$^+$) groups.

18. The method of claim 16, wherein the composition further includes:
an aggregation enhancing agent.

19. The method of claim 16, wherein the composition further includes:
a fluid carrier.

20. The method of claim 19, wherein the composition further includes:
a thickening agent.

21. A method for fracturing and propping a formation comprising the step of:
pumping a fracturing fluid including a proppant into a producing formation to enhance productivity at a pressure sufficient to fracture the formation so that the proppant can prop up the fractures; and pumping a composition comprising at least a particulate metal oxide-containing solid surface acidifying agent and a particulate metal oxide-containing solid surface modifying agent into the fractured formation to modify at least one of an aggregation potential and a zeta-potential of formation particles and formation surfaces so that the formation particles aggregate and/or cling to themselves and/or the formation surfaces where the acidifying agent acidifies the formation particles and the formation surfaces producing an effective number of surface hydroxyl groups (Sur-OH) and the surface modifying agent (A) converts, an effective portion of the Sur-OH groups into active surfaces salts (Sur-O$^-$-AH$^+$) resulting in the modification of the at least one of an aggregation potential and a zeta-potential of the formation particles and the formation surfaces.

22. The method of claim 21, wherein the composition further includes:
a particulate metal oxide-containing solid surface exchange agent (Z-X), where the exchange agent converts an effective amount of the active surfaces salts (Sur-O$^-$-AH$^+$) into exchanged surface salt (Sur-O$^-$-Z$^+$) groups.

23. The method of claim 21, wherein the composition further includes:
an aggregation enhancing agent.

24. The method of claim 21, wherein the composition further includes:
a fluid carder.

25. The method of claim 24, wherein the composition further includes:
a thickening agent.

26. A method for fracturing and propping a formation comprising the step of:
pumping a fracturing fluid into a producing formation to enhance productivity at a pressure sufficient to fracture the formation; pumping a proppant into the fracture formation to prop open fractures formed in the formation; and pumping a composition comprising at least a particulate metal oxide-containing solid surface acidifying agent and a particulate metal oxide-containing solid surface modifying agent into the propped and fractured formation to modify at least one of an aggregation potential and a zeta-potential of the proppant, formation particles and formation surfaces so that the proppant and/or formation particles aggregate and/or cling to the formation surfaces where the acidifying agent acidifies the formation particles and the formation surfaces producing an effective number of surface hydroxyl groups (Sur-OH) and the surfacing modifying agent (A) converts an effective portion of the Sur-OH groups into active surfaces salts (Sur-O$^-$-AH$^+$) resulting in the modification of the at least one of an aggregation potential and a zeta-potential of the formation particles and the formation surfaces.

27. The method of claim 26, wherein the composition further includes:
a particulate metal oxide-containing solid surface exchange agent (Z-X), where the exchange agent converts an effective amount of the active surfaces salts (Sur-O$^-$-AH$^+$) into exchanged surface salt (Sur-O$^-$-Z$^+$) groups.

28. The method of claim 26, wherein the composition further includes:
an aggregation enhancing agent.

29. The method of claim 26, wherein the composition further includes:
a fluid carrier.

30. The method of claim 29, wherein the composition further includes: a thickening agent.

31. A method for fracturing and propping a formation comprising the step of:

pre-treating a producing formation with a composition comprising at least a particulate metal oxide-containing solid surface acidifying agent and a particulate metal oxide-containing solid surface modifying agent to modify at least one of an aggregation potential and a zeta-potential of formation surfaces so that the formation surfaces and particles formed therefrom will tend to aggregate and/or cling to themselves where the acidifying agent acidifies the formation particles and the formation surfaces producing an effective number of surface hydroxyl groups (Sur-OH) and the surfacing modifying agent (A) converts an effective portion of the Sur-OH groups into active surfaces salts (Sur-O$^-$-AH$^+$) resulting in the modification of the at least one of an aggregation potential and a zeta-potential of the formation particles and the formation surfaces; pumping a fracturing fluid into the pre-treated producing formation to enhance productivity at a pressure sufficient to fracture the pre-treated producing formation; and pumping a proppant into the fractured formation to prop open fractures formed in the formation.

32. The method of claim 31, wherein the composition further includes:

a particulate metal oxide-containing solid surface exchange agent (Z-X), where the exchange agent converts an effective amount of the active surfaces salts (Sur-O$^-$-AH$^+$) into exchanged surface salt (Sur-O$^-$-Z$^+$) groups.

33. The method of claim 31, wherein the composition further includes:

an aggregation enhancing agent.

34. The method of claim 31, wherein the composition further includes:

a fluid carrier.

35. The method of claim 34, wherein the composition further includes:

a thickening agent.

* * * * *